US011230911B2

(12) United States Patent
Zhou et al.

(10) Patent No.: US 11,230,911 B2
(45) Date of Patent: Jan. 25, 2022

(54) WELLBORE SERVICING FLUID AND METHODS OF MAKING AND USING SAME

(71) Applicant: Halliburton Energy Services, Inc., Houston, TX (US)

(72) Inventors: Hui Zhou, The Woodlands, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/111,011

(22) Filed: Dec. 3, 2020

(65) Prior Publication Data
US 2021/0388699 A1    Dec. 16, 2021

Related U.S. Application Data

(60) Provisional application No. 63/037,186, filed on Jun. 10, 2020.

(51) Int. Cl.
*E21B 43/16* (2006.01)
*C09K 8/536* (2006.01)
*C09K 8/08* (2006.01)
*C09K 8/035* (2006.01)

(52) U.S. Cl.
CPC .............. *E21B 43/16* (2013.01); *C09K 8/035* (2013.01); *C09K 8/08* (2013.01); *C09K 8/536* (2013.01)

(58) Field of Classification Search
CPC ........... E21B 43/16; C09K 8/035; C09K 8/08; C09K 8/12; C09K 8/536
See application file for complete search history.

(56) References Cited

U.S. PATENT DOCUMENTS

| | | |
|---|---|---|
| 4,422,947 A | 12/1983 | Dorsey et al. |
| 4,652,384 A | 3/1987 | Francis et al. |
| 5,514,644 A | 5/1996 | Dobson |
| 5,616,541 A | 4/1997 | Dobson, Jr. et al. |
| 5,641,728 A | 6/1997 | Dobson, Jr. et al. |
| 5,804,535 A | 9/1998 | Dobson et al. |
| 5,851,959 A | 12/1998 | Bernu |
| 6,180,571 B1 | 1/2001 | Sifferman et al. |
| 6,300,286 B1 | 10/2001 | Dobson, Jr. et al. |
| 6,420,319 B1 | 7/2002 | Estes et al. |
| 7,211,548 B2 | 5/2007 | Munoz, Jr. et al. |
| 7,214,647 B2 | 5/2007 | Dobson, Jr. et al. |
| 2003/0191029 A1 | 10/2003 | Dino |
| 2004/0038830 A1 | 2/2004 | Stover |
| 2005/0003968 A1 | 1/2005 | Simonides et al. |
| 2006/0211580 A1 * | 9/2006 | Wang ........................ C09K 8/72 507/209 |
| 2007/0179291 A1 * | 8/2007 | Thibodeau .............. A61L 15/60 536/47 |
| 2012/0298357 A1 | 11/2012 | Ezell et al. |
| 2019/0136110 A1 | 5/2019 | AlBahrani et al. |

FOREIGN PATENT DOCUMENTS

EP    1071732 B1    7/2003

OTHER PUBLICATIONS

Foreign Communication from Related Application—International Search Report and Written Opinion of the International Searching Authority, International Application No. PCT/US2021/028537, dated Aug. 5, 2021, 10 pages.
Filing Receipt and Specification for U.S. Appl. No. 63/037,186, entitled "A Wellbore Servicing Fluid and Methods of Making and Using the Same," filed Jun. 10, 2020, 42 pages.

* cited by examiner

*Primary Examiner* — Aiqun Li
(74) *Attorney, Agent, or Firm* — Conley Rose, P.C.; Rodney B. Carroll

(57) ABSTRACT

A method of servicing a wellbore penetrating a subterranean formation, comprising placing into the wellbore a wellbore servicing fluid comprising a superabsorbent starch hydrogel (SSH) and an aqueous fluid, wherein the SSH is formed from an SSH reaction mixture comprising a starch, a crosslinker, a base, and water.

20 Claims, No Drawings

WELLBORE SERVICING FLUID AND METHODS OF MAKING AND USING SAME

CROSS-REFERENCE TO RELATED APPLICATIONS

This application claims priority under 35 U.S.C. § 119(e) to U.S. Provisional Patent Application No. 63/037,186 filed on Jun. 10, 2020 and entitled "A Wellbore Servicing Fluid and Methods of Making and Using Same," the disclosure of which is hereby incorporated herein by reference in its entirety.

BACKGROUND

This disclosure relates generally to methods of servicing a wellbore. More specifically, it relates to methods of treating a wellbore penetrating a subterranean formation, for example during a drilling operation or a completion operation.

Natural resources such as gas, oil, and water residing in a subterranean formation are usually recovered by drilling a wellbore down to the subterranean formation while circulating a drilling fluid, also referred to as drilling mud, in the wellbore. The drilling fluid is usually circulated downward through an interior of a drill pipe and upward through an annulus, which is located between the exterior of the drill pipe and the interior wall of the wellbore. The presence of such a drilling fluid aids in the drilling operation, for example, by removing cuttings from the wellbore (e.g., by suspending and releasing cuttings returned to the surface), controlling pressures within the subterranean formation, sealing permeable and/or semi-permeable portions of the subterranean formation, stabilizing the subterranean formation, cooling and lubricating the drilling apparatus, and facilitating completion operations. As it circulates through the wellbore during a drilling operation, the drilling fluid is deposited on the surfaces of the growing wellbore in a thin, low-permeability layer known as a filter cake, thus inhibiting the loss of mud and/or mud filtrate or other wellbore fluids to the formation during the drilling and/or other servicing operations.

Filter cakes and other debris left in the wellbore can have an adverse effect on several aspects of a wellbore's completion and production stages, from inhibiting the performance of downhole tools to inducing formation damage and plugging production tubing. Prior to production, the filter cake can be removed to allow the unimpeded flow of natural resources to the wellbore. The cleanup of filter cake deposited by drilling fluids remains a challenge because of the inefficient breaking of some components in the filter cake. For example, when using xanthan gum as a viscosifier, there are enzymes that can break down the xanthan gum, however, the enzymes are less effective in high salinity brines that are typically used to achieve a desired fluid density.

Also, in various scenarios, fluid in a wellbore may communicate with fluid in the subterranean formation around the wellbore. It is well known that wellbores pass through a number of zones within a subterranean formation other than the particular hydrocarbon zones of interest. Some of these zones are permeable (i.e., permeable zones), and thus may have water influx, gas influx, or both from the subterranean formation surrounding a wellbore into the wellbore. In one scenario, undesired water production, gas production, or both can affect the economic life of hydrocarbon producing wells and can potentially induce other types of problems, such as sand production, scale, and corrosion of tubulars. In another scenario, fluids used in servicing a wellbore may be lost to the subterranean formation via a permeable zone while circulating the fluids in the wellbore. In particular, the fluids may enter the subterranean formation via lost circulation zones, for example, depleted zones, zones of relatively low pressure, zones having naturally-occurring fractures, weak zones having fracture gradients exceeded by the hydrostatic pressure of the wellbore servicing fluid (e.g., drilling fluid), and so forth. As a result, the service provided by such wellbore servicing fluids is more difficult to achieve.

Thus, an ongoing need exists for a wellbore servicing fluid that can generate easy-to-remove filter cakes, and that can be used to plug a permeable zone such as a lost circulation zone.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

Disclosed herein is a method of servicing a wellbore penetrating a subterranean formation with a wellbore servicing fluid. The wellbore servicing fluid can be, without limitation, a drilling fluid (e.g., an aqueous drilling fluid, also referred to as a water-based drilling fluid), a completion fluid, or a lost circulation fluid. The wellbore servicing fluid can include a material that functions as both a viscosifier and a fluid loss control additive.

In aspects, the method includes placing a wellbore servicing fluid into the wellbore. In an aspect, the wellbore servicing fluid includes a hydrogel and an aqueous fluid. Herein the term hydrogel refers to a network of polymer chains that are hydrophilic, sometimes found as a colloidal gel in which water is the dispersion medium. A three-dimensional solid results from the hydrophilic polymer chains being held together by cross-links. Because of the inherent cross-links, the structural integrity of the hydrogel network does not dissolve from a high concentration of water. In one or more aspects the hydrogel is formed from a starch and is termed a superabsorbent starch hydrogel or an SSH.

The SSH in the wellbore servicing fluid can function as a viscosifier, a fluid loss control additive, or both. The SSH can be present in the wellbore servicing fluid in an amount of from about 1 wt. % to about 5 wt. %, alternatively from about 1 wt. % to about 4.5 wt. %, or alternatively from about 1 wt. % to about 4 wt. %, based on a total weight of the wellbore servicing fluid. In one or more aspects, an SSH suitable for use in the present disclosure is a reaction product formed from an SSH reaction mixture including a starch, a crosslinker, a base, and water. Methods of preparing an SSH are disclosed in more detail later herein.

The SSH reaction mixture can include a starch. A starch is a polymeric carbohydrate including numerous glucose units joined by glycosidic bonds and having n repeating units such as depicted below.

In an aspect, the starch is a gelling starch. For example, the starch may be an amylopectin-containing starch containing about 25 wt. % amylopectin. Starch containing about 25 wt. % amylopectin when dissolved in water and heated forms a gel when the solution is allowed to cool to room temperature.

In an aspect, the starch is present in the SSH reaction mixture in an amount of from about 1 wt. % to about 15 wt. %, based on a total weight of the SSH reaction mixture, alternatively from about 2 wt. % to about 13 wt. %, or alternatively from about 3 wt. % to about 12 wt. %.

The SSH reaction mixture can include a crosslinker. A crosslinker can connect units between neighboring chains of atoms in a complex chemical molecule (e.g., a polymer, a biopolymer such as a starch) and/or between molecules. In

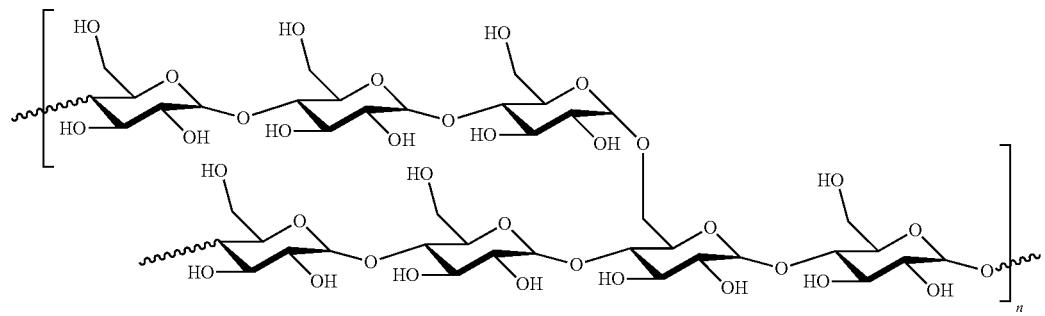

Starches can be produced by most green plants as energy storage and are contained in staple foods such as potatoes, maize (or corns), rice, cassava, as well as in the grain Emmer wheat (*Triticum amyleum*). Starches include two types of molecules: amylose and amylopectin. In an aspect, a starch of the type in the present disclosure includes equal to or greater than about 10 wt. % amylopectin, alternatively equal to or greater than about 15 wt. %, alternatively equal to or greater than about 20 wt. %, or alternatively equal to or greater than about 25 wt. %, based on a total weight of the starch.

The starch can include any starch that is suitable for use in the disclosed methods. In an aspect, the starch includes corn starch, potato starch, tapioca starch, rice starch, cassava starch, cereal starch, tuber starch, starch derivatives, waxy maize, dextrinized starch, chemically modified starch, or combinations thereof. Chemically modified starches are those derived from natural starches by chemical reaction of a natural starch with a suitable organic reactant. Examples of suitable chemically modified starches include, but are not limited to, carboxymethyl starch, hydroxyethyl starch, hydroxypropyl starch, acetate starch, sulfamate starch, sulfonated starch, phosphate starch, nitrogen modified starch, and starches grafted with acrylonitrile, acrylamide, acrylic acid, methacrylic acid, maleic anhydride, styrene, and combinations thereof. In an aspect, the starch is a granular starch or mixture of starches.

In an aspect, the starch includes a pre-gelatinized starch. Pre-gelatinized starches may be obtained commercially or they may be prepared by pre-gelatinization treatment. For example, during pre-gelatinization, the chosen starch granules are heated in water to a point where the starch granules swell irreversibly. Upon cooling, this swollen structure is retained. The use of pre-gelatinized starches may be advantageous, since these materials are stable at higher temperatures that may be encountered in a wellbore formation, e.g., up to 300° F.

an aspect, the crosslinker includes epichlorohydrin, epihalohydrin, diepoxides, dialdehydes, diacids, anhydrides, divinylsulfone, borates, phosphates, glutaraldehyde, succinic acid, succinic anhydrides, or combinations thereof. A weight ratio of the starch to the crosslinker present in the SSH reaction mixture can be from about 0.4 to about 20, alternatively from about 0.4 to about 10, alternatively from about 0.4 to about 11, alternatively from about 0.4 to about 12, alternatively from about 0.4 to about 13, alternatively from about 0.4 to about 14, alternatively from about 0.4 to about 15, alternatively from about 0.4 to about 16, alternatively from about 0.4 to about 17, alternatively from about 0.4 to about 18, alternatively from about 0.4 to about 19, alternatively from about 0.4 to about 20, alternatively from about 0.4 to about 2, alternatively from about 0.8 to about 2, or alternatively from about 1 to about 2, or alternatively from about 1.2 to about 1.7.

The SSH reaction mixture can include a base. In an aspect, the base includes sodium hydroxide, potassium hydroxide, or combinations thereof. The base can be present in the SSH reaction mixture in any amount sufficient to produce a reaction mixture pH of from about 11 to about 14, alternatively from about 11 to about 13 or alternatively from about 12 to about 13. For example, the base may be present in the SSH reaction mixture in an amount of from about 0.5 wt. % to about 5 wt. %, alternatively from about 0.6 wt. % to about 5 wt. %, alternatively from about 0.7 wt. % to about 5 wt. %, alternatively from about 0.8 wt. % to about 5 wt. %, alternatively from about 0.9 wt. % to about 5 wt. %, alternatively from about 1 wt. % to about 5 wt. %, alternatively from about 1 wt. % to about 4.5 wt. %, or alternatively from about 1.5 wt. % to about 4.5 wt. %, based on a total weight of the SSH reaction mixture.

The SSH reaction mixture can include water. Generally, the water may be from any source, provided that it does not contain an amount of components that may undesirably affect the other components of the SSH reaction mixture. Water can be present in the in the SSH reaction mixture in an amount of from about 85 wt. % to about 99 wt. %, alternatively from about 90 wt. % to about 98.5 wt. %, or alternatively from about 90 wt. % to about 98 wt. %, based on a total weight of the SSH reaction mixture. A volume ratio of the water to the SSH present in the SSH reaction mixture can be in a range of from about 5:1 to about 20:1, alternatively from about 6:1 to about 19:1, or alternatively from about 7:1 to about 18:1.

In an aspect, the SSH reaction mixture further includes a polymer. The polymer can include polyacrylamide, polyacrylic acid, polymethacrylic acid, poly(N-vinylpyrrolidone), poly(N-vinyllactam), poly(vinyl alcohol), poly(2-acrylamido-2-methylpropanesulfonic acid), copolymers, or combinations thereof. The polymer can be present in the SSH reaction mixture in an amount of from about 0.2 wt. % to about 2 wt. %, alternatively from about 0.2 wt. % to about 1.8 wt. %, or alternatively from about 0.4 wt. % to about 1.8 wt. %, based on a total weight of the SSH reaction mixture.

An SSH of the type disclosed herein can be prepared using any suitable method. In an aspect, the method of making the SSH includes preparing an SSH reaction mixture of the type disclosed herein. For example, the SSH reaction mixture may be prepared by first contacting a starch with water at a first temperature to form a solution. The first temperature can be from about 50° C. to about 100° C., alternatively from about 50° C. to about 90° C., or alternatively from about 50° C. to about 80° C., alternatively from about 50° C. to about 70° C., or alternatively from about 50° C. to about 60° C. In one or more optional aspects, the solution is formed by the contacting of a starch, a polymer, and water.

Contacting of the aforementioned components (e.g., starch and water or starch, polymer and water) can be carried out in any suitable container. The container can be any container that is compatible with the SSH reaction mixture having sufficient space for the SSH reaction mixture. In an aspect, the method further includes blending the solution at the first temperature. The blending can be carried out using any suitable methodology, for example a blender or a stir bar. During blending, the starch can dissolve in the water to form a homogeneous solution.

In an aspect, the method further includes cooling the solution to a second temperature to form a cooled solution. The second temperature can be from about 20° C. to about 40° C., alternatively from about 25° C. to about 40° C., or alternatively from about 30° C. to about 40° C. In an aspect, the method further includes adding a base of the type disclosed herein to the cooled solution. The base can be pre-dissolved in water (e.g., forming a base solution with about 10 wt. %, 20 wt. %, 30 wt. %, 40 wt. %, 50 wt. %, 60 wt. %, or 70 wt. % of the base) and then added to the cooled solution. Addition of the base to the cooled solution can continue until the pH of the solution is adjusted to a range from about 11 to about 14, alternatively from about 11 to about 13, or alternatively from about 12 to about 13. The result is an alkaline reaction solution (ARS).

In an aspect, the method further includes contacting a crosslinker of the type disclosed herein with the ARS to form an SSH reaction mixture. The SSH reaction mixture can then be blended for a period of from about 2 hours to about 24 hours, alternatively from about 4 hours to about 24 hours, or alternatively from about 4 hours to about 20 hours, at a third temperature to form the SSH. The third temperature can be from about 20° C. to about 40° C., alternatively from about 25° C. to about 40° C., or alternatively from about 30° C. to about 40° C. The resulting SSH can be characterized as a gelatinous mixture with little to no flow behavior.

In an aspect, the method further includes drying the SSH. Drying can be carried out using any suitable method, such as using an oven. Before and/or after drying, the method can further includes sizing the SSH by cutting and/or grinding the SSH. In some aspects the SSH is sized to any dimension compatible with a user and/or process goal, for example the SSH may be converted from a dried cohesive gel into a powder. The cutting and/or grinding can be performed using any suitable method (e.g., a grinder, a cutter).

In an aspect, a SSH of the type disclosed herein is water-swellable. The SSH can have a capacity to absorb water, wherein a volume ratio of absorbed water to the SSH is in a range of from about 5:1 to about 150:1, alternatively from about 5:1 to about 100:1, or alternatively from about 5:1 to about 90:1. The capacity to absorb water (e.g., a maximum capacity) is considered to be reached after full absorption of water (e.g., soaking in sufficient amount of water for 24 hours).

In an aspect, a sized SSH of the type disclosed herein may be included in a wellbore servicing fluid. For example, the SSH (e.g., a dry particulate material) can be transported to and/or stored at a wellsite, and a wellbore servicing fluid of the type disclosed herein comprising an SSH can be prepared and used in a wellbore servicing operation.

In an aspect, a wellbore servicing fluid of the type in the present disclosure can include an aqueous fluid. The aqueous fluid in the wellbore servicing fluid can be selected from a group consisting of freshwater, seawater, saltwater, brine (e.g., underground natural brine, formulated brine, etc.), and combinations thereof. Generally, the aqueous fluid in the wellbore servicing fluid may be from any source, provided that it does not contain an amount of components that may undesirably affect the other components in the wellbore servicing fluid. The aqueous fluid can be present in the wellbore servicing fluid in an amount effective to provide a pumpable slurry having desired (e.g., job or service specific) rheological properties. The aqueous fluid can be present in the wellbore servicing fluid in an amount of from about 80 wt. % to about 99 wt. % based on the total weight of the wellbore servicing fluid, alternatively from about 80 wt. % to about 97 wt. % or alternatively from about 80 wt. % to about 95 wt. %. The amount of the aqueous fluid in the wellbore servicing fluid may not include the amount of water in the SSH reaction mixture.

In an aspect, the aqueous fluid includes saltwater. The saltwater can be saturated or nearly saturated with salts. Representative salts include the chloride, bromide, iodide, acetate, and formate salts of potassium, sodium, calcium, magnesium, and zinc. Examples of saltwater suitable for use in this disclosure include without limitation saturated or partially saturated aqueous solutions including halide-containing salts, alkali metal salts, alkaline metal salts, formate-containing compounds, sodium bromide (NaBr), calcium chloride ($CaCl_2$)), calcium bromide ($CaBr_2$), sodium chloride (NaCl), zinc bromide ($ZnBr_2$), sodium formate, cesium formate, potassium formate, and combinations thereof.

The salt can be present in the saltwater in an amount of from about 1 wt. % to about 70 wt. %, alternatively from about 5 wt. % to about 70 wt. % or alternatively from about 8 wt. % to about 65 wt. %, based on a total weight of the saltwater.

In an aspect, the wellbore servicing fluid further includes a biopolymer. The biopolymer can include xanthan gum, guar gum, guar derivatives, chitosan, cellulose, cellulose derivatives, gum tragacanth, gum arabic, galactomannan gum, or combinations thereof of. The biopolymer can be present in the wellbore servicing fluid in a total amount of less than about 10 wt. %, alternatively less than about 9 wt. %, alternatively less than about 8 wt. %, alternatively less than about 7 wt. %, alternatively less than about 6 wt. %, alternatively less than about 5 wt. %, alternatively less than about 4 wt. %, alternatively less than about 3 wt. %, alternatively less than about 2 wt. %, alternatively less than about 1 wt. %, alternatively less than about 0.1 wt. %, alternatively less than about 0.01 wt. %, alternatively less than about 0.001 wt. %, alternatively less than about 0.0001 wt. % or alternatively less than about 0.00001 wt. %, based on a total weight of the wellbore servicing fluid. In an aspect, xanthan gum is present in the wellbore servicing fluid in a total amount of less than about 0.1 wt. %, alternatively less than about 0.05 wt. %, or alternatively less than about 0.01 wt. %, based on a total weight of the wellbore servicing fluid. In an aspect, the wellbore servicing fluid excludes a biopolymer, alternatively excludes xanthan gum.

In an aspect, the wellbore servicing fluid further includes a defoamer. The defoamer can include polyglycol; polyethylene glycol; polypropylene glycol; polytetrahydrofuran; polypropylene glycol on diatomaceous earth; a mixture of polypropylene glycol, olefin oil and hydrophobically modified silica; salts of sulfonated naphthalene-formaldehyde condensate; salts of sulfonated naphthalene-formaldehyde condensates combined with polyvinylpyrolidone; salts of sulfonated melamine-formaldehyde condensates; salts of polyether polycarboxylate; sulfonic-acid esters; carbohydrate esters; modified lignosulfonates; polyol silicone compounds; or combinations thereof. In an aspect, the defoamer is present in the wellbore servicing fluid in an amount of from about 0.01 wt. % to about 0.1 wt. %, alternatively from about 0.02 wt. % to about 0.1 wt. % or alternatively from about 0.02 wt. % to about 0.08 wt. %, based on a total weight of the wellbore servicing fluid.

In an aspect, the wellbore servicing fluid further includes one or more additives. The one or more additives can be included in the wellbore servicing fluid for improving or changing the properties thereof. The one or more additives can include an expansion agent, a fume silica, a free fluid control additive, a vitrified shale, a thixotropic agent, a silicate-control agent, a biostatic agent, a storage stabilizer, a filtration control additive, particulate materials, emulsifiers, viscosifiers, acids, bases, surfactants, mutual solvents, corrosion inhibitors, conventional breaking agents, relative permeability modifiers, lime, gelling agents, crosslinking agents, weighting agents, weight-reducing agents (e.g., hollow glass or ceramic beads), glass fibers, carbon fibers, suspending agents, clays, clay control agents, a clay stabilizer, fluid loss control additives, flocculants, conditioning agents, dispersants, water softeners, foaming agents, proppants, salts, oxidation inhibitors, scale inhibitors, thinners, scavengers, gas scavengers, lubricants, friction reducers, bridging agents, a foam stabilizer, latex emulsions, a formation conditioning agent, elastomers, gas/fluid absorbing materials, resins, superabsorbers, mechanical property modifying additives (i.e. metal fibers, minerals fibers, latexes, etc.), inert particulates, and the like, or combinations thereof.

The one or more additives can be present in the wellbore servicing fluid in a total amount of from about 0.1 wt. % to about 5 wt. % based on a total weight of the wellbore servicing fluid, alternatively from about 0.1 wt. % to about 4.5 wt. % or alternatively from about 0.1 wt. % to about 4 wt. %.

In an aspect, the wellbore servicing fluid has a density of from about 9 pounds per gallon (ppg) to about 20 ppg, alternatively from about 9 ppg to about 18 ppg or alternatively from about 10 ppg to about 18 ppg.

A wellbore servicing fluid of the type disclosed herein can be a thixotropic fluid. Being thixotropic means having a property of thixotropy, which is a time-dependent shear thinning property. When a stress is applied (being shaken, agitated, sheared or otherwise stressed) to a thixotropic fluid, the thixotropic fluid becomes thin and less viscous over time; after the stress stops, it will take a finite time period for the thixotropic fluid to return to a viscous state.

In an aspect, the wellbore servicing fluid has a rheology reading by a Fann® Model 35 viscometer at a speed of from about 3 rpm to about 600 rpm in a range of from equal to or greater than about 3 lb/100 ft$^2$ to equal to or less than about 150 lb/100 ft$^2$ at about 120° F., alternatively a range of from equal to or greater than about 3 lb/100 ft$^2$ to equal to or less than about 140 lb/100 ft$^2$, or alternatively a range of from equal to or greater than about 3 lb/100 ft$^2$ to equal to or less than about 135 lb/100 ft$^2$, when measured by in accordance with a test standard API-RP-10B-2.

In an aspect, the wellbore servicing fluid has a 10-second static gel strength of from about 3 lb/100 ft$^2$ to about 20 lb/100 ft$^2$, at about 120° F., alternatively from about 3 lb/100 ft$^2$ to about 19 lb/100 ft$^2$, or alternatively from about 3 lb/100 ft$^2$ to about 18 lb/100 ft$^2$, when measured in accordance with test standard API-RP-10B-2. In an aspect, the wellbore servicing fluid has a 10-minute static gel strength of from about 3 lb/100 ft$^2$ to about 20 lb/100 ft$^2$, at about 120° F., alternatively from about 3 lb/100 ft$^2$ to about 19 lb/100 ft$^2$, or alternatively from about 3 lb/100 ft$^2$ to about 18 lb/100 ft$^2$, when measured in accordance with a test standard API-RP-10B-2.

In an aspect, the wellbore servicing fluid has a plastic viscosity (PV) of from about 9 cp to about 40 cp at about 120° F., alternatively from about 9 cp to about 38 cp, or alternatively from about 9 cp to about 36 cp, when measured in accordance with a test standard API-RP-10B-2.

In an aspect, the wellbore servicing fluid has a yield point (YP) of from about 9 lb/100 ft$^2$ to about 40 lb/100 ft$^2$ at about 120° F., alternatively from about 9 lb/100 ft$^2$ to about 38 lb/100 ft$^2$, or alternatively from about 9 lb/100 ft$^2$ to about 36 lb/100 ft$^2$, when measured in accordance with a test standard API-RP-10B-2.

In an aspect, the wellbore servicing fluid has a low shear yield point (LSYP) of from about 4 lb/100 ft$^2$ to about 18 lb/100 ft$^2$ at about 120° F., alternatively from about 4 lb/100 ft$^2$ to about 17 lb/100 ft$^2$, or alternatively from about 4 lb/100 ft$^2$ to about 16 lb/100 ft$^2$, when measured in accordance with a test standard API-RP-10B-2.

A wellbore servicing fluid of the type disclosed herein can be prepared using any suitable method. In an aspect, the method includes placing a mixture of components (e.g., the SSH, an aqueous fluid, a defoamer, one or more additives, etc.) of the wellbore servicing fluid into a suitable container (e.g., a mixer, a blender) and blending the mixture until the mixture becomes a pumpable fluid (e.g., a homogeneous fluid).

The container can be any container that is compatible with the mixture and has sufficient space for the mixture. In an aspect, the wellbore servicing fluid is prepared at the wellsite. The solid composition (e.g., the SSH, one or more additives) of the wellbore servicing fluid can be transported to the wellsite and combined (e.g., mixed/blended) with an aqueous fluid (e.g., a saltwater) located proximate the wellsite to form the wellbore servicing fluid. The aqueous fluid can be conveyed from a source to the wellsite or be available at the wellsite prior to the combining. The solid composition of the wellbore servicing fluid can be prepared at a location remote from the wellsite and transported to the wellsite, and, if necessary, stored at an on-site location. When it is desirable to prepare the wellbore servicing fluid at the wellsite, the solid composition of the wellbore servicing fluid along with the aqueous fluid can be added into a container (e.g. a blender tub, for example mounted on a trailer), and the mixture is then blended until the mixture becomes a pumpable fluid (e.g., a homogeneous fluid). Additives (e.g., the SSH, optional other additives) can be added to the wellbore servicing fluid during preparation thereof (e.g., during blending) and/or on-the-fly (e.g., in real time or on-location) by addition to (e.g., injection into) the wellbore servicing fluid when being pumped into the wellbore.

The method as disclosed herein can be used any time in the life of a well (e.g., in drilling, openhole sections, completion, and/or workover operations). In an aspect, the wellbore servicing fluid of the type disclosed herein is a drilling fluid.

In an aspect, a drilling fluid of the type disclosed herein is placed in the wellbore under conditions suitable to form a filter cake over at least a portion of the wellbore. In such an aspect, a drilling fluid (e.g., drilling mud) of the type disclosed herein is circulated through the wellbore while the wellbore is drilled. The drilling fluid can be circulated down through a conduit (e.g., a drill pipe) deposited in the wellbore and back up through an annular space between an outer surface of the conduit and a wellbore wall. As the drilling fluid is circulated through the wellbore, a portion of the drilling fluid can be deposited on a downhole surface (e.g., wellbore surface, formation surface, etc.) over at least a portion of the wellbore, thereby forming a filter cake. Presence of the filter cake may inhibit the loss of the drilling fluid or other fluids into the formation and may contribute to formation control and wellbore stability.

A filter cake can be formed by residue deposited on a wellbore wall when a fluid, such as a drilling fluid of the type disclosed herein, is forced against the wellbore wall under a pressure (e.g., a downhole pressure during a drilling operation). In an aspect, the filter cake includes an SSH of the type disclosed herein. A filter cake can also include polymeric materials, a bridging agent, drill solids (e.g., aluminosilicates, clays), metal ions, or combinations thereof. Nonlimiting examples of metal ions that may be found in a filter cake include $Ca^{2+}$ (e.g., in a form of calcium carbonate), $Mg^{2+}$, $Ba^{2+}$, $Sr^{2+}$, $Fe^{2+}$, $Fe^{3+}$, $Cu^{2+}$, $Ag^+$, $Ni^{2+}$, $Cr^{3+}$, and the like.

In one or more aspects of the present disclosure, subsequent operations in the wellbore may be facilitated by removal of the filter cake. In such aspects, the filter cake may be removed by contacting of the filter cake with a breaker fluid. The breaker fluid can include an acid, an acid precursor, an enzyme, an oxidant, a chelating agent, or combinations thereof. In one or more aspects, the breaker fluid includes an enzyme such as amylase, which is an enzyme that catalyzes the hydrolysis of starch into sugars. In one or more aspects, the breaker fluid includes an enzyme such as amylase promotes degradation (e.g., hydrolysis) of SSH present in the filter cake.

The method can further include placing a breaker fluid of the type disclosed herein into the wellbore. The breaker fluid may be contacted with the filter cake and allowed to remove all or a portion of the filter cake. In an aspect, the method further includes allowing the breaker fluid to remove (e.g., break-down, degrade, destabilize, etc.) all or a portion of the SSH in the filter cake. When desired (for example, upon reaching a desired depth), circulation of the drilling fluid can be stopped, and the breaker fluid can be placed downhole via the conduit (e.g., a drill pipe) to contact the filter cake. In an aspect, the breaker fluid is placed (e.g., injected) into the wellbore and in contact with the filter cake therein by the same pumping system utilized to circulate drilling fluid through the wellbore during the drilling thereof. In an aspect, the method further includes closing a fluid isolation valve above a portion of the wellbore where the breaker fluid has been placed. The closing of the fluid isolation valve can avoid communication of fluids above and below the fluid isolation valve so that the wellbore is in a "shut-in" state (e.g., shut in the wellbore for a time sufficient to allow the removal of the filter cake).

In an aspect, the method further includes allowing the breaker fluid to remove all or a portion of the filter cake. In an aspect, when a sufficient quantity of the breaker fluid has been placed within the wellbore, the breaker fluid may be allowed to remain in contact with the filter cake for a sufficient period of time. For example, in such an aspect, the breaker fluid may be allowed to remain in contact with the filter cake for a soak period, for example, for a period of time of at least about 1 hour, alternatively at least about 8 hours, alternatively at least about 48 hours, alternatively at least about 84 hours. In an aspect, during such a "soak period," the fluids within the wellbore may remain in a substantially static state, for example, as opposed to a dynamic state in which circulation may be present. In an aspect, the wellbore may be shut-in (e.g., by closing the fluid isolation valve) while the breaker fluid remains in contact with the filter cake (e.g., soaks the filter cake).

Following treatment with a breaker fluid of the type disclosed herein, further servicing operations may be performed (e.g., completion and/or production operations) as desired or appropriate, as for example in a hydrocarbon-producing well. In an aspect, a suitable flushing fluid or a spacer fluid is circulated through the wellbore to wash any remaining filter cake from the downhole surface. Generally, the flushing fluid utilized can be an aqueous solution which does not adversely affect the permeability of the formation.

In an aspect, a method of servicing a wellbore penetrating a subterranean formation includes placing a wellbore servicing fluid (e.g., a drilling fluid) of the type described herein into the wellbore. The wellbore servicing fluid can include an aqueous fluid and a superabsorbent starch hydrogel (SSH), which can be formed from an SSH reaction mixture including a starch, epichlorohydrin (ECH), sodium hydroxide, and water. In an aspect, a weight ratio of the starch to ECH is in a range of from about 0.5 to about 20, alternatively from about 1.0 to about 20, or alternatively from about 1.2 to about 20.

The method can further include forming a filter cake including the SSH in the wellbore. In such an aspect, a wellbore servicing fluid (e.g., a drilling fluid) of the type disclosed herein is circulated through the wellbore while the wellbore is drilled. The drilling fluid can be circulated down through a conduit (e.g., a drill pipe) deposited in the wellbore and back up through an annular space between an outer surface of the conduit and a wellbore wall. As the drilling fluid is circulated through the wellbore, a portion of the drilling fluid including the SSH can be deposited on a downhole surface (e.g., wellbore surface, formation surface, etc.) over at least a portion of the wellbore, thereby forming a filter cake including the SSH.

In aspects, the method further includes placing a breaker fluid into the wellbore and allowing the breaker fluid to remove all or a portion of the SSH in the filter cake. In such aspects, the filter cake including the SSH may be removed by contacting of the filter cake with the breaker fluid. The breaker fluid can include a breaker such as amylase. When desired (for example, upon reaching a desired depth), circulation of the drilling fluid can be stopped, and the breaker fluid can be placed downhole via the conduit (e.g., a drill pipe) to contact the filter cake. In an aspect, the breaker fluid is placed (e.g., injected) into the wellbore and in contact with the filter cake therein by the same pumping system utilized to circulate drilling fluid through the wellbore during the drilling thereof. In an aspect, when a sufficient quantity of the breaker fluid has been placed within the wellbore, the breaker fluid may be allowed to remain in contact with the filter cake for a sufficient period of time to allow a removal of all or a portion of the SSH in the filter cake.

In an aspect, the wellbore servicing fluid of the type disclosed herein (i.e., including an SSH) is used as a completion fluid in a variety of completion operations. For example, the completion fluid may be used in operations after drilling, but before a start of production. In an aspect, the completion operation includes preparing the bottom of the well bore to the required specifications, running in production tubing and its associated downhole equipment, or carrying out production enhancement operations. By way of example, the completion fluid may be present in the well bore while equipment, such as screens, production liners, and/or downhole valves, is run into the well bore. In an aspect, the completion fluid may be present in the well bore while perforations are formed in the casing disposed in the well bore. Among other functions, the completion fluid can act to control formation pressures.

In aspects, the subterranean formation includes one or more permeable zones and the wellbore servicing fluid of the type disclosed herein (i.e., including an SSH) is placed proximate the one or more permeable zones. In some such aspects, the wellbore servicing fluid may also be referred to as a lost circulation fluid where the wellbore servicing fluid is used to restrict or prevent loss of a wellbore fluid (e.g., a circulated drilling fluid) to the surrounding formation.

As used herein, a permeable zone in the wellbore refers to an area in the wellbore or the subterranean formation adjacent to the wellbore through which fluid can undesirably migrate. Such permeable zones may be present in, for example, the subterranean formation surrounding a wellbore, the wall of a conduit disposed in the wellbore such as a casing, a sealant/cement column disposed in an annulus of the wellbore between the casing and a subterranean formation penetrated by the wellbore, a microannulus interposed between the casing and the sealant/cement column, a microannulus interposed between the sealant/cement column and the formation, or combinations thereof. Permeable zones can include fluid flow paths extending between the wellbore and the surrounding formation, for example, a fissure, a crack, a fracture, a vug, a streak, a flow channel, a void, a perforation formed by a perforating gun, and combinations thereof.

In aspects, the one or more permeable zones include a water and/or gas influx zone, which allows a formation fluid such as water and/or gas to pass from a surrounding formation into the wellbore via the influx zone, and thus form crossflows in fluids residing in the wellbore such as a cement slurry before it sets. In some other aspects, the one or more permeable zones include a lost circulation zone such as a fracture through which fluids (e.g., drilling fluids) being circulated in the wellbore can undesirably pass from the wellbore into the subterranean formation. In an aspect, the wellbore servicing fluid is a drilling fluid that flows from the wellbore into a surrounding formation via the lost circulation zone. In an aspect, the wellbore is an injection well, in which fluids in the wellbore pass from the wellbore into the subterranean formation due to existing of one or more lost circulation zones in the wellbore, and a pressure difference between the inside of the wellbore and the subterranean formation.

In aspects, the one or more permeable zones can be present in an uncased portion and/or a cased portion of the wellbore. When a permeable zone in a wellbore is uncased, the inside of the wellbore is exposed to the subterranean formation without being protected by casing, thus it is easier to have fluid communication between the wellbore and the subterranean formation around the wellbore in the permeable zone. Alternatively, the one or more permeable zones can be present in a cased portion of the wellbore. Casing can be placed into a wellbore after the drilling operation. Through the life of the wellbore, there can be holes in a casing wall in various scenarios (e.g., casing can be structurally damaged at certain places where unexpected stress applies or where a corrosive fluid contacts the casing for a certain time), causing undesired fluid communications across the casing wall.

A lost circulation fluid of the type disclosed herein can be placed proximate one or more permeable zones of the types disclosed hereinabove. The method disclosed herein can further include allowing the SSH to contact the one or more permeable zones and impede a flow of fluid through at least a portion of the one or more permeable zones. The flow of fluid can be an inflow of fluid from the subterranean formation into the wellbore or impede an outflow of fluid from the wellbore into the subterranean formation.

In an aspect, the one or more permeable zones include a water and/or gas influx zone, and water and/or gas can undesirably flow from the surrounding formation into the wellbore via the influx zone. For example, during drilling, when a water/gas influx zone is encountered (for example a high pressure water producing zone, a high pressure gas producing zone, or both), water, gas, or both can flow, via one or more flow paths present in the subterranean formation, from the formation through the wellbore wall into the wellbore. This will dilute the drilling fluid inside the wellbore and thus make the drilling fluid less effective, and this also causes other issues that may hamper or restrict continued drilling operations and the ability to extend casing strings to desired depths. It is desirable to treat the water/gas influx zones to restrict this flow of water, gas, or both. Alternatively, one or more flow paths providing for an undesired water/gas influx can be formed as a result of loss of structural integrity of the casing (e.g., casing corrosion). The lost circulation fluid including an SSH can impede fluid flow through at least a portion of the flow paths of water/gas influx.

Disclosed herein is a method of treating a subterranean formation penetrated by a wellbore, including drilling the wellbore with a drill bit connected to drill pipe and determining a location of an influx flow path from the subterranean formation into an uncased portion of the wellbore providing for an undesirable influx of water, gas, or both from the subterranean formation into the uncased portion of the wellbore. A drilling fluid can be used during the drilling.

In an aspect, the drilling fluid is a different type from the type of the wellbore servicing fluid disclosed herein. Upon discontinuing drilling, the method can further include introducing, via the drill pipe, a wellbore servicing fluid of the type disclosed herein into at least a portion of the influx flow path from the subterranean formation into the uncased portion of the wellbore. In an aspect, the method further includes allowing the SSH of the type in the present disclosure to block at least a portion of the influx flow path of water, gas, or both into the wellbore from the subterranean formation. Then drilling of the wellbore can be resumed.

In another aspect, the drilling fluid is a wellbore servicing fluid of the type disclosed herein. In such an aspect, drilling can be either discontinued or continued. More of the drilling fluid can be placed, via the drill pipe, approximate the location of the influx flow path. The method can further include allowing the drilling fluid to flow into at least a portion of the influx flow path from the subterranean formation into the uncased portion of the wellbore. The SSH in the drilling fluid can be allowed to block at least a portion of the influx flow path of water, gas, or both into the wellbore from the subterranean formation. In aspects where drilling is discontinued, after at least a portion of the influx flow path is blocked, drilling of the wellbore can be resumed.

In an aspect, the one or more permeable zones include a lost circulation zone. Fluids used in servicing a wellbore can be lost to the subterranean formation while circulating the fluids in the wellbore. In particular, the fluids may enter the subterranean formation via lost circulation zones, for example, depleted zones, zones of relatively low pressure, zones having naturally occurring fractures, weak zones having fracture gradients exceeded by the hydrostatic pressure of the drilling fluid, and so forth. As a result, the service provided by such fluid is more difficult to achieve. For example, a secondary cement/sealant composition may be lost to the formation as it is being placed in the wellbore, thereby rendering the secondary operation ineffective in maintaining isolation of the formation. In an aspect, a wellbore servicing fluid of the type disclosed herein flows from the wellbore into the lost circulation zone. The SSH in the wellbore servicing fluid of the type disclosed herein can impede fluid flow through at least a portion of the lost circulation zone.

Disclosed herein is a method of treating a subterranean formation penetrated by a wellbore, including drilling the wellbore with a drill bit connected to drill pipe and determining a location of a lost circulation zone in an uncased portion of the wellbore. A drilling fluid can be used during the drilling.

In an aspect, the drilling fluid is a different type from the type of a wellbore servicing fluid disclosed herein. The method can further include discontinuing drilling and introducing a wellbore servicing fluid of the type disclosed herein at the location of the lost circulation zone. The wellbore servicing fluid can be introduced via the drill pipe. In an aspect, the method further includes allowing the wellbore servicing fluid to flow into at least a portion of the lost circulation zone. The method can includes allowing the SSH to block at least a portion of the lost circulation zone. Then drilling of the wellbore can be resumed.

In another aspect, the drilling fluid is a wellbore servicing fluid of the type disclosed herein. In such an aspect, drilling can be either discontinued or continued. More of the drilling fluid can be placed, via the drill pipe, approximate the location of the lost circulation zone. The method can further include allowing the drilling fluid to flow into at least a portion of the lost circulation zone and allowing the SSH in the drilling fluid to block at least a portion of the lost circulation zone. In aspects where drilling is discontinued, after at least a portion of the lost circulation zone is blocked, drilling of the wellbore can be resumed.

In an aspect of the present disclosure, wellbore servicing fluids including an SSH of the type disclosed herein may display advantageous rheological features such as a low shear plastic viscosity and thixotropic behavior. Further, a drilling fluid including an SSH may form a stable filter cake that can be effectively removed thereby minimizing the potential of formation damage.

Additional Disclosure

The following enumerated aspects of the present disclosure are provided as nonlimiting examples.

A first aspect which is a method of servicing a wellbore penetrating a subterranean formation, comprising: placing into the wellbore a wellbore servicing fluid comprising a superabsorbent starch hydrogel (SSH) and an aqueous fluid, wherein the SSH is formed from an SSH reaction mixture comprising a starch, a crosslinker, a base, and water.

A second aspect which is the method of the first aspect wherein the wellbore servicing fluid is a drilling fluid, a completion fluid, or a lost circulation fluid.

A third aspect which is the method of any of the first through second aspects wherein the wellbore is an injection well.

A fourth aspect which is the method of any of the first through third aspects wherein the SSH is present in the wellbore servicing fluid in an amount of from about 1 wt. % to about 5 wt. %, based on a total weight of the wellbore servicing fluid.

A fifth aspect which is the method of any of the first through fourth aspects wherein the starch comprises a gelling starch.

A sixth aspect which is the method of any of the first through fifth aspects wherein the hydrogel is water-swellable.

A seventh aspect which is the method of any of the first through sixth aspects wherein the hydrogel has a capacity of absorbing water wherein a volume ratio of absorbed water to the hydrogel is in a range of from about 5:1 to about 150:1.

An eighth aspect which is the method of any of the first through seventh aspects wherein the starch comprises equal to or greater than about 10 wt. % amylopectin, based on a total weight of the starch.

A ninth aspect which is the method of any of the first through eighth aspects wherein the starch is pre-gelatinized.

A tenth aspect which is the method of any of the first through ninth aspects wherein the starch comprises corn starch, potato starch, tapioca starch, rice starch, cassava starch, cereal starch, tuber starch, starch derivatives, waxy maize, dextrinized starch, chemically modified starch, or combinations thereof.

An eleventh aspect which is the method of any of the first through ninth aspects the starch is present in the SSH reaction mixture in an amount of from about 1 wt. % to about 15 wt. %, based on a total weight of the SSH reaction mixture.

A twelfth aspect which is the method of any of the first through eleventh aspects wherein the crosslinker comprises epichlorohydrin, epichhalohydrin, diepoxides, dialdehydes, diacids, anhydrides, borates, phosphates, citric acid, divinyl sulphone, carbodimide, glutraldehyde, succinic acid, succinic anhydrides, or combinations thereof.

A thirteenth aspect which is the method of any of the first through twelfth aspects wherein a weight ratio of the starch to the crosslinker present in the SSH reaction mixture is in a range of from about 0.4 to about 20.

A fourteenth aspect which is the method of any of the first through thirteenth aspects wherein the water is present in the in the SSH reaction mixture in an amount of from about 85 wt. % to about 99 wt. %, based on a total weight of the SSH reaction mixture.

A fifteenth aspect which is the method of any of the first through fourteenth aspects wherein a volume ratio of the water to the SSH present in the SSH reaction mixture is in a range of from about 5:1 to about 20:1.

A sixteenth aspect which is the method of any of the first through fifteenth aspects wherein the base comprises sodium hydroxide, potassium hydroxide, or combinations thereof.

A seventeenth aspect which is the method of any of the first through sixteenth aspects the base is present in the SSH reaction mixture in an amount of from about 0.5 wt. % to about 5 wt. %, based on a total weight of the SSH reaction mixture.

An eighteenth aspect which is the method of any of the first through seventeenth aspects wherein the SSH reaction mixture further comprises a polymer.

A nineteenth aspect which is the method of the eighteenth aspect wherein the polymer comprises polyacrylamide, polyacrylic acid, polymethacrylic acid, poly(N-vinylpyrrolidone), poly(N-vinyllactam), poly(vinyl alcohol), poly(2-acrylamido-2-methylpropanesulfonic acid), copolymers, or combinations thereof.

A twentieth aspect which is the method of any of the eighteenth through nineteenth aspects wherein the polymer is present in the SSH reaction mixture in an amount of from about 0.2 wt. % to about 2 wt. %, based on a total weight of the SSH reaction mixture.

A twenty-first aspect which is the method of any of the first through twentieth aspects wherein the aqueous fluid is selected from a group consisting of freshwater, saltwater, brine, seawater, and combinations thereof.

A twenty-second aspect which is the method of any of the first through twenty-first aspects wherein the aqueous fluid in the wellbore servicing fluid is saltwater comprising chloride, bromide, iodide, acetate, and formate salts of potassium, sodium, calcium, magnesium, and zinc, or combinations thereof.

A twenty-third aspect which is the method of the twenty-second aspect wherein the salt is present in the saltwater in an amount of from about 1 wt. % to about 70 wt. %, based on a total weight of the salt water.

A twenty-fourth aspect which is the method of any of the first through twenty-third aspects wherein the aqueous fluid is present in the wellbore servicing fluid in an amount of from about 80 wt. % to about 99 wt. %, based on a total weight of the wellbore servicing fluid.

A twenty-fifth aspect which is the method of any of the first through twenty-fourth aspects wherein the wellbore servicing fluid further comprises a biopolymer.

A twenty-sixth aspect which is the method of any of the first through twenty-fifth aspects wherein the biopolymer comprises xanthan gum, guar gum, guar derivatives, chitosan, cellulose, cellulose derivatives, gum tragacanth, gum arabic, galactomannan gum, or combinations thereof of.

A twenty-seventh aspect which is the method of any of the first through twenty-sixth aspects wherein the biopolymer is present in the wellbore servicing fluid in a total amount of less than about 10, 9, 8, 7, 6, 5, 4, 3, 2, 1, 0.1, 0.01, 0.001, 0.0001 or 0.00001 wt. %, based on a total weight of the wellbore servicing fluid.

A twenty-eighth aspect which is the method of any of the twenty-fifth through twenty-seventh aspects wherein xanthan gum is present in the wellbore servicing fluid in a total amount of less than about 0.1 wt. %, based on a total weight of the wellbore servicing fluid.

A twenty-ninth aspect which is the method of any of the first through twenty-eighth aspects wherein the wellbore servicing fluid excludes xanthan gum.

A thirtieth aspect which is the method of any of the first through twenty-ninth aspects wherein the wellbore servicing fluid further comprises a defoamer.

A thirty-first aspect which is the method of any of the first through thirtieth aspects wherein the defoamer comprises polyglycol; polyethylene glycol; polypropylene glycol; polytetrahydrofuran; polypropylene glycol on diatomaceous earth; a mixture of polypropylene glycol, olefin oil and hydrophobically modified silica; salts of sulfonated naphthalene-formaldehyde condensate; salts of sulfonated naphthalene-formaldehyde condensates combined with polyvinylpyrrolidone; salts of sulfonated melamine-formaldehyde condensates; salts of polyether polycarboxylate; sulfonic-acid esters; carbohydrate esters; modified lignosulfonates; polyol silicone compounds; or combinations thereof.

A thirty-second aspect which is the method of any of the thirtieth through thirty-first aspects wherein the defoamer is present in the wellbore servicing fluid in an amount of from about 0.01 wt. % to about 0.1 wt. %, based on a total weight of the wellbore servicing fluid.

A thirty-third aspect which is the method of any of the first through thirty-second aspects wherein the wellbore servicing fluid further comprises one or more additives.

A thirty-fourth aspect which is the method of the thirty-third aspect wherein one or more additives comprise an expansion agent, a fume silica, a free fluid control additive, a vitrified shale, a thixotropic agent, a silicate-control agent, a biostatic agent, a storage stabilizer, a filtration control additive, particulate materials, emulsifiers, viscosifiers, acids, bases, surfactants, mutual solvents, corrosion inhibitors, conventional breaking agents, relative permeability modifiers, lime, gelling agents, crosslinking agents, weighting agents, weight-reducing agents, glass fibers, carbon fibers, suspending agents, clays, clay control agents, a clay stabilizer, fluid loss control additives, flocculants, conditioning agents, dispersants, water softeners, foaming agents, proppants, salts, oxidation inhibitors, scale inhibitors, thinners, scavengers, gas scavengers, lubricants, friction reducers, bridging agents, a foam stabilizer, latex emulsions, a formation conditioning agent, elastomers, gas/fluid absorbing materials, resins, superabsorbers, mechanical property modifying additives, inert particulates, and the like, or combinations thereof.

A thirty-fifth aspect which is the method of any of the thirty-third through thirty-fourth aspects wherein the one or more additives are present in the wellbore servicing fluid in a total amount of from about 0.1 wt. % to about 5 wt. %, based on a total weight of the wellbore servicing fluid.

A thirty-sixth aspect which is the method of any of the first through thirty-fifth aspects wherein the wellbore servicing fluid has a density of from about 9 pounds per gallon (ppg) to about 20 ppg.

A thirty-seventh aspect which is the method of any of the first through thirty-sixth aspects wherein the wellbore servicing fluid is a thixotropic fluid.

A thirty-eighth aspect which is the method of any of the first through thirty-seventh aspects wherein the wellbore servicing fluid has a rheology reading of from equal to or greater than about 3 lb/100 ft$^2$ to equal to or less than about 150 lb/100 ft$^2$ at about 120° F. and from about 3 rpm to about 600 rpm, when measured by in accordance with a test standard API-RP-10B-2.

A thirty-ninth aspect which is the method of any of the first through thirty-eighth aspects wherein the wellbore servicing fluid has a 10-second static gel strength of from about 3 lb/100 ft$^2$ to about 20 lb/100 ft$^2$ at about 120° F., when measured in accordance with a test standard API-RP-10B-2.

A fortieth aspect which is the method of any of the first through thirty-ninth aspects wherein the wellbore servicing fluid has a 10-minute static gel strength of from about 3 lb/100 ft$^2$ to about 20 lb/100 ft$^2$ at about 120° F., when measured in accordance with a test standard API-RP-10B-2.

A forty-first aspect which is the method of any of the first through fortieth aspects wherein the wellbore servicing fluid has a plastic viscosity of from about 9 cp to about 40 cp at about 120° F., when measured in accordance with a test standard API-RP-10B-2.

A forty-second aspect which is the method of any of the first through forty-first aspects wherein the wellbore servicing fluid has a yield point of from about 9 lb/100 ft$^2$ to about 40 lb/100 ft$^2$ at about 120° F., when measured in accordance with a test standard API-RP-10B-2.

A forty-third aspect which is the method of any of the first through forty-second aspects wherein the wellbore servicing fluid has a low shear yield point of from about 4 lb/100 ft$^2$ to about 18 lb/100 ft$^2$ at about 120° F., when measured in accordance with a test standard API-RP-10B-2.

A forty-fourth method of making the SSH of any of the first through forty-third aspects comprising: contacting the starch with water at a first temperature of from about 50° C. to about 100° C. to form a solution; cooling the solution to a second temperature of from about 20° C. to about 40° C.; adding a base into the solution; contacting the crosslinker with the solution to form the SSH reaction mixture; and blending the SSH reaction mixture for a period of from about 2 hours to about 24 hours at a third temperature of from about 20° C. to about 40° C. to form the SSH.

A forty-fifth aspect which is the method of the forty-fourth aspect wherein the base is pre-dissolved in water.

A forty-sixth aspect which is the method of any of the forty-fourth through forty-fifth aspects wherein the solution has a pH of from about 11 to about 14.

A forty-seventh aspect which is the method of any of the forty-fourth through forty-sixth aspects, wherein the method further comprises contacting a polymer with the starch and water to form the solution, prior to cooling the solution to a second temperature.

A forty-eighth aspect which is the method of any of the forty-fourth through forty-seventh aspects wherein the method further comprises blending the solution at the first temperature, prior to cooling the solution to a second temperature.

A forty-ninth aspect which is the method of any of the forty-fourth through forty-eighth aspects wherein the method further comprises: drying the SSH; and cutting and/or grinding the SSH into powder.

A fiftieth aspect which is the method of any of the first through forty-third aspects further comprising forming a filter cake in the wellbore.

A fifty-first aspect which is the method of the fiftieth aspect wherein the filter cake comprises the SSH.

A fifty-second aspect which is the method of any of the fiftieth through fifty-first aspects further comprising: placing a breaker fluid comprising a breaker into the wellbore; and allowing the breaker fluid to remove all or a portion of the filter cake.

A fifty-third aspect which is the method of the fifty-second aspect wherein the breaker comprises an acid, an acid pre-cursor, an enzyme, an oxidant, a chelating agent, or combinations thereof.

A fifty-fourth aspect which is the method of the fifty-third aspect wherein the enzyme comprises an amylase.

A fifty-fifth aspect which is a method of servicing a wellbore penetrating a subterranean formation, comprising: placing into the wellbore a wellbore servicing fluid comprising a superabsorbent starch hydrogel (SSH) and an aqueous fluid, wherein the SSH is formed from an SSH reaction mixture comprising a starch, epichlorohydrin (ECH), sodium hydroxide, and water, wherein a weight ratio of the starch to ECH is in a range of from about 0.4 to about 20; forming a filter cake comprising the SSH in the wellbore; placing a breaker fluid comprising a breaker into the wellbore; and allowing the breaker fluid to remove all or a portion of the SSH in the filter cake.

A fifty-sixth aspect which is the method of the fifty-fifth aspect wherein the breaker comprises amylase.

A fifty-seventh aspect which is the method of any of the first through forty-third aspects wherein the subterranean formation comprises one or more permeable zones and the wellbore servicing fluid is placed proximate the one or more permeable zones.

A fifty-eighth aspect which is the method of the fifty-seventh aspect wherein the one or more permeable zones comprise a lost circulation zone and wherein the wellbore servicing fluid is a drilling fluid that flows from the wellbore into a surrounding formation via the lost circulation zone.

A fifty-ninth aspect which is the method of the fifty-seventh aspect wherein the one or more permeable zones comprise a water and/or gas influx zone and wherein water and/or gas flows from a surrounding formation into the wellbore via the influx zone.

A sixtieth aspect which is the method of any of the fifty-seventh through fifty-ninth aspects further comprising allowing the SSH to contact the one or more permeable zones and impede an inflow of fluid from the subterranean formation into the wellbore or impede an outflow of fluid from the wellbore into the subterranean formation.

A sixty-first aspect which is a method of treating a subterranean formation penetrated by a wellbore, comprising drilling the wellbore with a drill bit connected to drill pipe; determining a location of an influx flow path from the subterranean formation into an uncased portion of the wellbore providing for an undesirable influx of water, gas, or both from the subterranean formation into the uncased portion of the wellbore; upon discontinuing drilling, introducing, via the drill pipe, a wellbore servicing fluid into at least a portion of the influx flow path from the subterranean formation into the uncased portion of the wellbore, wherein the wellbore servicing fluid comprises a superabsorbent starch hydrogel (SSH) and an aqueous fluid, wherein the SSH is formed from an SSH reaction mixture comprising a starch, a crosslinker, a base, and water; allowing the SSH to block at least a portion of the influx flow path of water, gas, or both into the wellbore from the subterranean formation; and resuming drilling of the wellbore.

A sixty-second aspect which is a method of treating a subterranean formation penetrated by a wellbore, comprising: drilling the wellbore with a drill bit connected to drill pipe; determining a location of a lost circulation zone in an uncased portion of the wellbore; discontinuing drilling; introducing, via the drill pipe, a wellbore servicing fluid at the location of the lost circulation zone, wherein the wellbore servicing fluid comprises a superabsorbent starch hydrogel (SSH) and an aqueous fluid, wherein the SSH is formed from an SSH reaction mixture comprising a starch, a crosslinker, a base, and water; allowing the wellbore servicing fluid to flow into at least a portion of the lost circulation zone; allowing the SSH to block at least a portion of the lost circulation zone; and resuming drilling of the wellbore.

A sixty-third aspect which is a wellbore servicing fluid additive comprising a superabsorbent starch hydrogel (SSH), wherein the SSH is formed from an SSH reaction mixture comprising a starch, a crosslinker, a base, and water.

A sixty-fourth aspect which is a wellbore serving fluid comprising the wellbore servicing fluid additive of the sixty-third aspect and an aqueous fluid.

A sixty-fifth aspect wherein the wellbore servicing fluid of the sixty-fourth aspect is a drilling fluid, a completion fluid, or a lost circulation fluid.

A sixty-six aspect which is the wellbore serving fluid additive of any of the sixty-third through sixty fifth aspects wherein the starch is characterized in any of the fifth through eleventh aspects, the crosslinker is characterized in any twelfth through thirteenth aspects, the water is characterized in any of claims fourteenth through fifteenth aspects, and the base is characterized in any of claims sixteenth through seventeenth aspects.

A sixty-seventh aspect which is the wellbore serving fluid additive of any of the sixty-third or sixty-sixth aspects or the wellbore serving fluid of any of the sixty-fourth through sixty-sixth aspects, wherein the crosslinker is epichlorohydrin (ECH) and the base is sodium hydroxide.

The sixty-eight aspect which is the wellbore serving fluid additive of any of the sixty-third and sixty-sixth through sixty-seventh aspects, or the wellbore serving fluid of any of the sixty-fourth through sixty-seventh aspects, wherein the SSH reaction mixture further comprises a polymer, wherein the polymer is characterized in any of the eighteenth through twentieth aspects.

A sixty-ninth aspect which is the wellbore serving fluid of any of the sixty-fourth through sixty-eighth aspects, wherein the SSH is in an amount as characterized in the fourth aspect.

A seventieth aspect which is the wellbore serving fluid of any of the sixty-fourth through sixty-ninth aspects, wherein the aqueous fluid is characterized in any of the twenty-first through twenty-fourth aspects.

A seventy-first aspect which is the wellbore serving fluid of any of the sixty-fourth through seventieth aspects, further comprising a biopolymer, wherein the biopolymer is characterized in any of the twenty-fifth through twenty-eighth aspects.

A seventy-second aspect which is wellbore serving fluid of any of the sixty-fourth through seventy-first aspects excluding xanthan gum.

A seventy-third aspect which is the wellbore serving fluid of any of the sixty-fourth through seventy-second aspects, wherein the wellbore servicing fluid further comprises a defoamer, wherein the defoamer is characterized in any of the thirtieth through thirty-second aspects.

A seventy-fourth aspect which is the wellbore serving fluid of any of the sixty-fourth through seventy-third aspects, wherein the wellbore servicing fluid further comprises one or more additives, wherein the one or more additives are characterized in any of claims 33-35.

A seventy-fifth aspect which is the wellbore serving fluid of any of the sixty-fourth through seventy-fourth aspects having a density characterized in claim 36.

A seventy-sixth aspect wherein the wellbore serving fluid of any of the sixty-fourth through seventy-fifth aspects is a thixotropic fluid.

A seventy-seventh aspect wherein the wellbore serving fluid of any of the sixty-fourth through seventy-sixth aspect, has a rheology reading characterized in the thirty-eighth aspect.

A seventy-eighth aspect which is the wellbore serving fluid of any of the sixty-fourth through seventy-seventh aspect, having a 10-second static gel strength characterized in the thirty-ninth aspect, and a 10-minute static gel strength characterized in the fortieth aspect.

A seventy-ninth aspect which is the wellbore serving fluid of any of the sixty-fourth through seventy-eighth aspects, having a plastic viscosity characterized in the forty-first aspect, a yield point characterized in the forty-second aspect, and a low shear yield point characterized in the forty-third aspect.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

SSH samples were prepared as follows: 120 ml of deionized water was placed into a glass jar and heated with stirring. Pre-gelatinized starch (8.0 g) was added slowly to the water and the mixture was heated to a temperature in a range of 50-60° C. in order to dissolve the starch. After the starch was dissolved, the mixture was cooled to a temperature between 30° C. and 40° C. Sodium hydroxide (4.4 g in 10 g of deionized water) was added slowly to the cooled mixture. Crosslinker, epichlorohydrin (ECH), was added dropwise to the mixture to give five samples having the crosslinker present in amounts ranging from about 4.1 g to 10.4 g, as listed in Table 1. The samples were stirred overnight at temperatures ranging from 30° C. to 40° C. The stir bar was observed to stop mixing about 1 hour after introduction of the crosslinker as the SSH mixture became too viscous and eventually formed a hydrogel.

The SSH samples obtained can be cut into small pieces, dried, and grinded into fine powder before use.

The samples, prepared as described, were used directly to make wellbore servicing fluids of the present disclosure, also referred to herein as water-based drilling fluids, and fluid rheology was measured at 120° F. both before (BHR) and after (AHR) hot-rolling the water-based drilling fluids at 150° F. for 16 hours. The hot-rolling could keep the water-based drilling fluids at the temperature and in motion for the time period. Table 2 shows the fluid formulation and properties. As shown in Table 2, SSH samples #2, #3, and #6 give the best fluid rheology, in which an optimum starch/ECH ratio was between 1.2-4.0.

TABLE 1

SSH samples with different amount of crosslinkers

| Sample # | Pre-gelatinized starch (g) | Deionized water (g) | Epichlorohydrin (ECH, g) | Starch/ECH ratio |
|---|---|---|---|---|
| 1 | 8.0 | 120 | 4.1 | 1.95 |
| 2 | 8.0 | 120 | 4.9 | 1.63 |
| 3 | 8.0 | 120 | 6.2 | 1.29 |
| 4 | 8.0 | 120 | 8.3 | 0.96 |
| 5 | 8.0 | 120 | 10.4 | 0.57 |
| 6 | 8 | 100 | 2.0 | 4.00 |
| 7 | 8 | 72 | 0.83 | 9.64 |
| 8 | 8 | 72 | 0.42 | 19.0 |

TABLE 2

Drilling fluids with different SSH

| Drilling fluid # | F1 | | F2 | | F3 | | F4 | | F5 | | F6 | | F7 | | F8 | |
|---|---|---|---|---|---|---|---|---|---|---|---|---|---|---|---|---|
| SSH# | #1 | | #2 | | #3 | | #4 | | #5 | | #6 | | #7 | | #8 | |
| SSH, lb | 145 | | 145 | | 146 | | 149 | | 150 | | 116 | | 84 | | 82 | |
| Tap water, lb | 167 | | 167 | | 166 | | 163 | | 162 | | 196 | | 228 | | 230 | |
| Salt 1, lb | 77 | | 77 | | 77 | | 77 | | 77 | | 77 | | 77 | | 77 | |
| Salt 2, lb | 3 | | 3 | | 3 | | 3 | | 3 | | 3 | | 3 | | 3 | |
| Defoamer, lb | 0.2 | | 0.2 | | 0.2 | | 0.2 | | 0.2 | | 0.2 | | 0.2 | | 0.2 | |
| Particulate 1, lb | 20 | | 20 | | 20 | | 20 | | 20 | | 20 | | 20 | | 20 | |
| Particulate 2, lb | 20 | | 20 | | 20 | | 20 | | 20 | | 20 | | 20 | | 20 | |
| Fluid Rheology at 120° F. | BHR | AHR | BHR | AHR | BHR | AHR | BHR | AHR | BHR | AHR | BHR | AHR | BHR | AHR | BHR | AHR |
| 600 rpm, lb/100 ft$^2$ | 53 | 48 | 50 | 47 | 53 | 49 | 26 | 23 | 31 | 31 | 43 | 44 | 29 | 33 | 34 | 33 |
| 300 rpm, lb/100 ft$^2$ | 33 | 31 | 33 | 35 | 35 | 34 | 18 | 14 | 21 | 20 | 33 | 33 | 22 | 24 | 25 | 24 |
| 200 rpm, lb/100 ft$^2$ | 25 | 24 | 26 | 30 | 28 | 29 | 15 | 12 | 16 | 15 | 29 | 29 | 18 | 22 | 21 | 20 |
| 100 rpm, lb/100 ft$^2$ | 15 | 17 | 18 | 24 | 21 | 22 | 11 | 8 | 11 | 11 | 23 | 24 | 15 | 17 | 16 | 14 |
| 6 rpm, lb/100 ft$^2$ | 2 | 6 | 7 | 13 | 8 | 12 | 5 | 4 | 5 | 5 | 13 | 13 | 8 | 8 | 6 | 5 |
| 3 rpm, lb/100 ft$^2$ | 1 | 5 | 6 | 11 | 7 | 10 | 4 | 3 | 4 | 4 | 10 | 11 | 7 | 7 | 5 | 4 |
| 10 sec static gel strength, lb/100 ft$^2$ | 1 | 6 | 7 | 15 | 8 | 13 | 5 | 4 | 6 | 6 | 13 | 14 | 8 | 8 | 8 | 5 |
| 10 min static gel strength, lb/100 ft$^2$ | 2 | 7 | 10 | 15 | 10 | 13 | 6 | 4 | 6 | 6 | 45 | 17 | 46 | 10 | 18 | 7 |
| PV, cP | 20 | 17 | 17 | 12 | 18 | 15 | 8 | 9 | 10 | 11 | 10 | 11 | 7 | 9 | 9 | 9 |
| YP, lb/100 ft$^2$ | 13 | 14 | 16 | 23 | 17 | 19 | 10 | 5 | 11 | 9 | 23 | 22 | 15 | 15 | 16 | 15 |
| LSYP, lb/100 ft$^2$ | 0 | 4 | 5 | 9 | 6 | 8 | 3 | 2 | 3 | 3 | 7 | 9 | 6 | 6 | 4 | 3 |

Table 3 shows a comparison between an SSH and a typical crosslinked starch. The results demonstrate that even less than half amount of the active dry polymer (8 lb/bbl) provides better fluid rheology for the SSH. Active dry polymer refers to the pre-gelatinized starch in Table 1 for F2 and F3, and the typical crosslinked starch for F6 in Table 3. The drilling fluids made with the SSH showed much stronger thixotropic (shear-thinning) behavior than that with the typical crosslinked starch, with lower 600 rpm dial readings and higher 6 rpm/3 rpm dial readings. The strong thixotropic is a rheological behavior that can provide suspension for drill solid transportation while maintaining low equivalent circulating density (ECD) during drilling.

TABLE 3

Comparison between SSH and typical crosslinked starch

| Drilling fluid # | F2 | | F3 | | F5 | |
|---|---|---|---|---|---|---|
| SSH #2, lb* | 145 (8) | | — | | — | |
| SSH #3, lb* | — | | 146 (8) | | — | |
| Typical crosslinked starch, lb | — | | — | | 17 | |
| Tap water, lb | 167 | | 166 | | 312 | |
| Salt 1, lb | 77 | | 77 | | 51 | |
| Salt 2, lb | 3 | | 3 | | — | |
| Defoamer, lb | 0.2 | | 0.2 | | 0.2 | |
| Particulate 1, lb | 20 | | 20 | | 20 | |
| Particulate 2, lb | 20 | | 20 | | 20 | |
| Fluid Rheology at 120° F. | BHR | AHR | BHR | AHR | BHR | AHR |
| 600 rpm, lb/100 ft$^2$ | 50 | 47 | 53 | 49 | 76 | 84 |
| 300 rpm, lb/100 ft$^2$ | 33 | 35 | 35 | 34 | 55 | 60 |
| 200 rpm, lb/100 ft$^2$ | 26 | 30 | 28 | 29 | 45 | 49 |
| 100 rpm, lb/100 ft$^2$ | 18 | 24 | 21 | 22 | 32 | 34 |
| 6 rpm, lb/100 ft$^2$ | 7 | 13 | 8 | 12 | 9 | 8 |
| 3 rpm, lb/100 ft$^2$ | 6 | 11 | 7 | 10 | 8 | 7 |
| 10 sec static gel strength, lb/100 ft$^2$ | 7 | 15 | 8 | 13 | 8 | 7 |
| 10 min static gel strength, lb/100 ft$^2$ | 10 | 15 | 10 | 13 | 9 | 8 |
| PV, cP | 17 | 12 | 18 | 15 | 21 | 24 |
| YP, lb/100 ft$^2$ | 16 | 23 | 17 | 19 | 34 | 36 |
| LSYP, lb/ft$^2$ | 5 | 9 | 6 | 8 | 7 | 6 |

*Dry polymer is 8 lb/bbl shown in parenthesis.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A method of servicing a wellbore penetrating a subterranean formation, comprising: placing into the wellbore a wellbore servicing fluid comprising a superabsorbent starch hydrogel (SSH) and an aqueous fluid, wherein the SSH is formed from an SSH reaction mixture comprising a starch, a crosslinker, a base, and water; wherein the starch is present in the SSH reaction mixture in an amount of from about 1 wt. % to about 15 wt. %, based on a total weight of the SSH reaction mixture; wherein a weight ratio of the starch to the crosslinker present in the SSH reaction mixture is in a range of from about 0.4 to about 20; and wherein the wellbore servicing fluid is thixotropic.

2. The method of claim 1, wherein the wellbore servicing fluid is a drilling fluid, a completion fluid, or a lost circulation fluid.

3. The method of claim 1, wherein the wellbore is an injection well.

4. The method of claim 1, wherein the SSH is present in the wellbore servicing fluid in an amount of from about 1 wt. % to about 5 wt. %, based on a total weight of the wellbore servicing fluid.

5. The method of claim 1, wherein the starch comprises a gelling starch.

6. The method of claim 1, wherein the hydrogel is water-swellable.

7. The method of claim 1, wherein the hydrogel has a capacity of absorbing water wherein a volume ratio of absorbed water to the hydrogel is in a range of from about 5:1 to about 150:1.

8. The method of claim 1, wherein the starch comprises equal to or greater than about 10 wt. % amylopectin based on a total weight of the starch.

9. The method of claim 1, wherein the starch is pregelatinized.

10. The method of claim 1, wherein the starch comprises corn starch, potato starch, tapioca starch, rice starch, cassava starch, cereal starch, tuber starch, starch derivatives, waxy maize, dextrinized starch, chemically modified starch, or combinations thereof.

11. The method of claim 1, wherein the crosslinker comprises epichlorohydrin, epihalohydrin, diepoxides, dialdehydes, diacids, anhydrides, borates, phosphates, citric acid, divinyl sulphone, carbodimide, glutaraldehyde, succinic acid, succinic anhydrides, or combinations thereof.

12. The method of claim 1, wherein the water is present in the in the SSH reaction mixture in an amount of from about 85 wt. % to about 99 wt. %, based on a total weight of the SSH reaction mixture.

13. The method of claim 1, wherein a volume ratio of the water to the SSH present in the SSH reaction mixture is in a range of from about 5:1 to about 20:1.

14. The method of claim 1, wherein the base comprises sodium hydroxide, potassium hydroxide, or combinations thereof.

15. The method of claim 1, wherein the base is present in the SSH reaction mixture in an amount of from about 0.5 wt. % to about 5 wt. %, based on a total weight of the SSH reaction mixture.

16. The method of claim 1, wherein the SSH reaction mixture further comprises a polymer.

17. The method of claim 16, wherein the polymer comprises polyacrylamide, polyacrylic acid, polymethacrylic acid, poly(N-vinylpyrrolidone), poly(N-vinyllactam), poly(vinyl alcohol), poly(2-acrylamido-2-methylpropanesulfonic acid), copolymers, or combinations thereof.

18. The method of claim 16, wherein the polymer is present in the SSH reaction mixture in an amount of from about 0.2 wt. % to about 2 wt. %, based on a total weight of the SSH reaction mixture.

19. The method of claim 1, wherein the aqueous fluid is selected from a group consisting of freshwater, saltwater, brine, seawater, and combinations thereof.

20. The method of claim 1, wherein the wellbore servicing fluid has a 10-second static gel strength of from about 3 lb/100 ft$^2$ to about 20 lb/100 ft$^2$ when measured in accordance with test standard API-RP-10B-2.

\* \* \* \* \*